(12) United States Patent
Ansari et al.

(10) Patent No.: US 11,593,700 B1
(45) Date of Patent: Feb. 28, 2023

(54) NETWORK-ACCESSIBLE SERVICE FOR EXPLORATION OF MACHINE LEARNING MODELS AND RESULTS

(71) Applicant: Amazon Technologies, Inc., Seattle, WA (US)

(72) Inventors: Mohammed Hidayath Ansari, Seattle, WA (US); Avik Sinha, Seattle, WA (US); Kevin Michael Small, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1554 days.

(21) Appl. No.: 15/719,402

(22) Filed: Sep. 28, 2017

(51) Int. Cl.
*G06N 20/00* (2019.01)
*G06F 3/0484* (2022.01)
*G06N 3/08* (2006.01)

(52) U.S. Cl.
CPC .......... *G06N 20/00* (2019.01); *G06F 3/0484* (2013.01); *G06N 3/08* (2013.01)

(58) Field of Classification Search
CPC ......... G06N 20/00; G06N 3/08; G06F 3/0484
See application file for complete search history.

(56) References Cited

U.S. PATENT DOCUMENTS

2004/0083191 A1* 4/2004 Ronnewinkel et al. .. G06E 1/00
706/20
2015/0379430 A1* 12/2015 Dirac et al. ............ G06N 99/00

OTHER PUBLICATIONS

Ribeiro et al., "MLaas: Machine Learning as a Service," 2015 IEEE 14th International Conference on Machine Learning and Applications, pp. 896-902 (Year: 2015).*
Krause et al., "Interacting with Predictions: Visual Inspection of Black-box Machine Learning Models," CHI'16, May 7-12, 2016, San Jose, CA, USA, pp. 5686-5697 (Year: 2016).*
Arun, Pattathal Vijayakumar, "A visual mining based fame[sic] work for classification accuracy estimation," American Journal of Remote Sensing, 2013; 1(s): pp. 47-52 (Year: 2013).*
Becker, Barry G. "Visualizing decision table classifiers." Proceedings IEEE Symposium on Information Visualization (Cat. No. 98TB100258). IEEE, 1998 (Year: 1998).*
U.S. Appl. No. 15/686,086, filed Aug. 24, 2017, Sudipto Gupta, et al.
U.S. Appl. No. 15/633,424, filed Jun. 26, 2017, Kalidas Yeturu.
U.S. Appl. No. 15/074,203, filed Mar. 18, 2016, Wei Xia, et al.
U.S. Appl. No. 15/045,030, filed Feb. 16, 2016, Chatterjee, et al.

(Continued)

*Primary Examiner* — Eric Nilsson
(74) *Attorney, Agent, or Firm* — Robert C. Kowert; Kowert, Hood, Munyon, Rankin & Goetzel, P.C.

(57) ABSTRACT

At a machine learning service, a data structure generated during the training phase of a machine learning model, as well as an input records associated with a result of the model, are analyzed. A first informational data set pertaining to the result, which indicates an alternative result, is generated. The first informational data set is transmitted to a presentation device with a directive to display a visual representation of the data set. In response to an exploration request pertaining to the first informational data set, a second informational data set indicating one or more observations of a training data set used for the model is transmitted to the presentation device.

21 Claims, 12 Drawing Sheets

(56) References Cited

OTHER PUBLICATIONS

Amazon Web Services, "Amazon Machine Learning Developer Guide," Version Latest, 2016, pp. 1-152.

datascience.com, "Skater: Overview," download from https://datascienceinc.github.io/Skater/overview.html on Jul. 11, 2017, pp. 1-2.

datascience.com, "DataScience.com Releases Python Package for Interpreting the Decision-Making Processes o1 Predictive Models," May 23, 2017, download from https://www.datascience.com/newsroom/datasciencereleasesskaterpythonpackageforpredictivemodelinterpretation. pp. 1-5.

* cited by examiner

NETWORK-ACCESSIBLE SERVICE FOR EXPLORATION OF MACHINE LEARNING MODELS AND RESULTS

BACKGROUND

In recent years, as the costs of collecting and storing data has decreased, machine learning algorithms that analyze collected data sets for various types of predictions are being increasingly employed to increase the effectiveness of various services and applications. Large amounts of data with respect to user interactions with network-accessible applications (such as e-retail applications) may be collected, for example using logs generated at the applications' web servers and other components, and used to enhance usability or customize user experiences with the applications. Similarly, data collected from numerous sensors may be analyzed to improve the functionality of various devices and algorithms, including algorithms for enhancing security, predicting failures, and so on.

Supervised learning is a common approach used for many types of machine learning problems. In supervised learning, features derived from a set of labeled input observations are used to train a model, and the trained model is then used to generate predicted labels for new unlabeled observations. For example, in a medical application, an individual patient's medical data record, comprising entries collected from various instruments, medical scanning/imaging devices and the like may be labeled to indicate whether the patient suffers from a particular illness or not. Feature sets derived from a large numbers of such labeled records may then be used as a training data set for a machine learning model, with the objective of subsequently using the trained model to predict the probability that a given patient (whose medical record was not part of the training data set and is thus unlabeled) suffers from the same illness.

In many cases, the mathematics and statistics involved in the prediction methodologies used by machine learning models may not be easily understandable to at least some of the individuals affected by the predictions, or to individuals responsible for taking actions based on the predictions. Depending on the possible consequences of the actions which may have to be taken based on machine learning results, some model users may be reluctant to initiate the actions if they do not find the results intuitive, or are not provided at least some level of explanations for the results. Providing insights into machine learning model results in a user-friendly manner may represent a non-trivial technical challenge.

Figure 1:
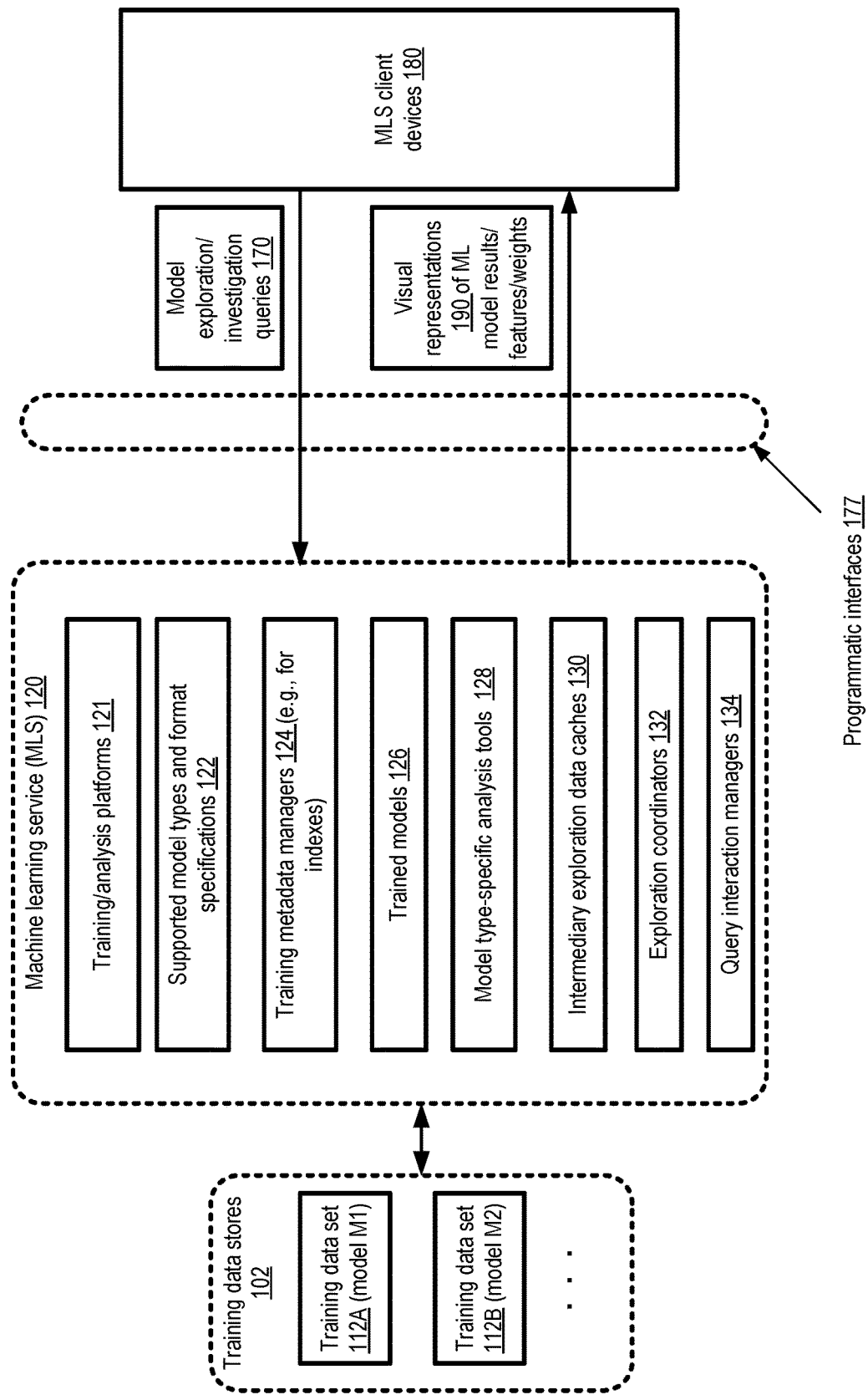
FIG. 1 illustrates an example system environment in which a machine learning service which enables clients to explore results and features of various classes of models using a visualization interface may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for enabling exploration and analysis of machine learning models and model results via easy-to-use interactive interfaces implemented by a network-accessible service are described. According to some embodiments, a machine learning service (MLS) may provide a variety of programmatic interfaces (such as web-based consoles, graphical user interfaces, application programming interfaces or APIs, command-line tools, etc.) enabling clients to submit requests for several types of operations, and receive corresponding responses. Clients may, for example, submit requests to train various types of machine learning models using specified training data sources, run trained models on specified input records, and/or to provide details or explanations regarding results of trained models or decisions made within the models.

In some embodiments, a query for an analysis of one or more results (such as a classification of some input record or document as a member of a particular class) of a trained version of a machine learning model may be received at one or more computing devices of the MLS. The MLS may have access to a representation of the trained model (such as a file containing various data structures generated during the model's training phase, as well as associated metadata)—e.g., either because the client provided the trained version of the model to the MLS, or because the model was trained at the MLS. In response to the query, internal data structures (e.g., matrices/vectors indicating weights assigned to various features, as well as other types of parameters or metadata) of the model, as well as the specific input records for which the results were generated, may be examined, e.g., using model-type-specific analysis tools at the MLS. Based on the examination of the internal data structures and the input records, the type of the model (e.g., whether the model was a classifier, a regression model, and so on) and/or on parameters of the query, the MLS may generate any of several types of informational data in various embodiments. The informational data may be transmitted to a presentation device (e.g., a laptop or desktop from which the query was submitted) in some embodiments, together with instructions on how the data is to be presented or laid out for viewing by the submitter of the query. In some embodiments, information regarding the provenance or origin of portions (or all) of the training data and/or post-training data records may also be presented, which may also help users understand model results and/or debug models. For example, training data records for some machine learning models may potentially be collected from a variety of sources (e.g., via crowdsourcing or other types of aggregation), and the records may be annotated to indicate their sources. When displaying information about influential features identified in the training data, or during other stages of model exploration, in some embodiments, the MLS may optionally (or on demand) provide information about the training data sources as well. In at least one embodiment, an explicit query may not be required to trigger the display of explanatory data—e.g., by default, when a new input record is processed, corresponding informational data may be generated and shown in some embodiments.

In at least some embodiments, the informational data may be displayed via an interactive interface, enabling a viewer to click on various links or other elements to further explore the model and/or the results as desired, e.g., during an exploration session comprising a sequence of multiple interactions. Various details of the model results, the features which contributed to the results, parameters whose values were learned, and/or internal decisions made at various stages of the algorithm employed by the model, may be provided to clients of the MLS via an intuitive interactive interface in different embodiments, taking advantage of the expert knowledge accumulated at the MLS regarding the implementations and internal logic of different types of machine learning models. The information provided to the clients may help increase the confidence of the clients in the models in various embodiments. In some cases, the information provided may also help with debugging the models (or identifying unexpected patterns in the training data set). In order to provide the explanations and exploration capabilities with respect to a given model, in at least some embodiments, MLS components may not need to re-run the model, or try to obtain results using variations of the input records for which explanation/exploration is desired; instead, an analysis of the internal data structures (at least some of which are generated during model training) and the input records themselves may be sufficient in such embodiments. In other embodiments, the MLS may re-execute at least some types of models to obtain the detailed information presented to clients during exploration sessions.

In some embodiments, as for example in the case of a classification model, there may be non-zero probabilities associated with several alternative results that could have been generated by a given model for a given input record, and an informational data set indicating the respective probabilities of other alternatives may be generated and presented visually to the query submitter. Consider an example scenario in which a classification model may assign a given input record R1 (such as a text document) to one of three classes {A, B, C}. Internally, the model may generate respective probabilities or scores associated with each of the classes with respect to R1—e.g., a 70% probability may be assigned to class A, a 20% probability may be assigned to class B, and so on. Based on a 70% probability for class A, R1 may be designated as a member of class A. To the client, a summarized version of the result may be provided initially by the model, indicating that A has been identified as the class for record R1. In response to a query pertaining to such a classification result, in some embodiments, components of the MLS may examine the trained model, and generate and display a data set indicating respective probabilities associated with alternative results (e.g., non-zero probabilities for designated the input record as a member of class B or class C). In response to additional exploration requests, the particular features which contributed most extensively to the results may be indicated, various training data observations comprising influential features may be indicated, the data sources from which those observations were obtained may be indicated, and so on.

The MLS may support exploration and analysis of a variety of machine learning model types in different embodiments, e.g., using respective model type-specific tools. For example, in various embodiments, some combination of regression models (such as linear or logistic regression models), decision-tree based models (e.g., classification and regression trees or CART models, random forest models, and the like), time series models, neural network-based models, and the like may be supported. The types of details and exploration capabilities provided by the MLS may of course differ based on the type of model in various embodiments. For example, for a decision-tree based model, a path taken through the decision tree in response to a given input record may be indicated by the MLS. Similarly, in the case of a convolutional neural network model with multiple convolution layers being used for image recognition, the image features detected at various layers may be indicated by the MLS during an exploration session, and so on.

In some embodiments, the specific formats in which trained models of various types may be submitted for analysis/exploration may be published or made available to clients by the MLS—e.g., in order to use the MLS to explore a particular model, a client may provide a file or other representation of the model expressed in a supported format via a programmatic interface. In at least some embodiments, the MLS may examine training data used for a model to provide some of the responses to clients' exploration requests. In such embodiments, an indication of the training data (e.g., a storage device/path address, a storage service URI, or the like indicating where the training data can be obtained), or the training data itself, may also be submitted programmatically. Of course, in scenarios in which the model was trained at the MLS itself at the request of the client, the training data and the representation of the trained model in an acceptable format may already be available at the MLS. The set of supported model types and/or acceptable formats may be expanded over time in at least some embodiments.

In at least some embodiments, the model exploration capabilities of the MLS may be incorporated within or linked to model debugging tools, e.g., to enable data scientists and/or other users to identify and resolve problems associated with the development or training of the models. For example, in embodiments in which the MLS provides statistics regarding the training data examples that contributed towards certain model results, a data scientist may in some cases be able to use the information provided by the MLS to determine that the sampling distribution of the training data was skewed or flawed. In such scenarios, the use of the MLS's interactive exploration capabilities may enable models to be retrained with better training data, thereby improving the overall accuracy and utility of the models.

In at least one embodiment, the MLS may be configurable to detect anomalous machine learning results, and automatically provide additional details regarding the anomalies or outliers. For example, in a scenario in which streaming data points (e.g., sensor data being collected over time from some production system) is being classified, the MLS may determine a normal/typical range for some results of the classification model being used, and detect when/if a particular result falls out of the normal range. An automatic notification may be generated in some embodiments in such a scenario, indicating the extent to which the result represents an anomaly, and/or the features or attributes of the input which were most influential with respect to the anomalous result.

In at least one embodiment, the machine learning model exploration and results explanations may be implemented using resources of a provider network or public cloud environment. In one embodiment, a standalone tool implemented at one or more computing devices, which provides machine learning model analysis similar to that described above without using provider network resources may be used—that is, the use of a provider network is not a requirement for the techniques described herein.

Example System Environment

FIG. 1 illustrates an example system environment in which a machine learning service which enables clients to explore results and features of various classes of models using a visualization interface may be implemented, according to at least some embodiments. As shown, system 100 may comprise various components and artifacts of a machine learning service (MLS) 120 implemented using a set of computing devices, including for example a set of execution platforms 121, specifications 122 indicating supported model types and formats, training metadata managers 124, trained models 126, model type-specific analysis tools 128, intermediary exploration data cached 130, exploration coordinators 132, and/or query interaction managers 134 in the depicted embodiment.

The MLS 120 may implement a set of programmatic interfaces 177 in various embodiments, such as web-based consoles, graphical user interfaces, a set of application programming interfaces (APIs), command-line tools and the like. Using such interfaces, model exploration/investigation queries 170 may be directed to the MLS from client devices 180 (e.g., laptops, desktops, portable computing devices or the like). In at least some embodiments, some or all of the MLS client devices may be utilized for presenting visualizations of the explored models and their results; that is, the client devices may be considered presentation devices in such embodiments. Query interaction manager(s) 134 of the MLS may receive a client-submitted query or request 170, parse/interpret the query, verify that the submitter is authorized to view the requested types of information, and pass an internal version of the query for implementation to one or more exploration coordinators 132 in the depicted embodiment. In at least some embodiments, authorization may only be required once per exploration session with respect to a particular model 126; e.g., repeated verification of the identity of the requester may not be required as additional queries are received during a given session.

A model exploration query 170 may include a parameter indicating a particular trained model 126 with respect to which additional details/explanation is being requested. In some embodiments, for example, a file containing a representation (in one of the supported formats 122) of the model (such as various internal data structures generated during the model's training phase, including structures representing learned parameters, weights, biases, meta-parameters etc.) may be included in the request 170, or a pointer to a trained model 126 already stored at or accessible to the MLS may be provided. In some cases, as discussed below in further detail, clients may submit requests to the MLS to train models on their behalf, in which case a representation of a trained version of the model may already be stored at the MLS.

In some embodiments, at least a portion of the training data used for the model 126 may have to be examined in order to respond to some types of model exploration requests. If the model 126 was trained at the MLS, a training data set 112 (such as training data set 112A for model M1, or training data set 112B for model M2) may be accessible to the MLS from one or more training data stores 102 in some embodiments. If the model was trained elsewhere (e.g., using resources at a publicly accessible data center), in at least some embodiments a pointer to a location of the training data may be provided to the MLS, or the training data itself may be provided, enabling the MLS to examine observation records of the training data if needed. In some embodiments, in order to speed up responses to various types of model exploration requests, metadata such as indexes on the training data may be generated (e.g., by training metadata managers 124) and stored by the MLS. For example, if the training data for a particular model comprises text documents, indexes indicating which particular observation records contained particular n-grams or unigrams may be generated in some embodiments. In various embodiments, as responses to client queries are generated during a given interaction session, the MLS may generate and store various types of intermediary exploration data (e.g., a respective ranked list of the top 100 features associated with each of several classes to which input records may be mapped) in caches 130. The cached data may be re-used, e.g., during the same session or during one or more other sessions associated with the same model.

The MLS 120 may comprise a variety of model type-specific tools 128 in the depicted embodiment. Each such tool may comprise software and/or hardware components specifically designed to analyze the internal data structures of a respective class of machine learning model, stored in a supported format 122 in the depicted embodiment.

In various embodiments, in response to a particular query 170 received during an interaction session from a client, such as a query to provide additional information or explanations for a particular result obtained from a trained model 126, an exploration coordinator 132 may analyze the input records associated with the query as well as the contents of data structures representing the model (at least some of which may have been generated during the model's training phase) and/or intermediary exploration data caches. From the data structures, learned weights/coefficients associated with different features in the training data may be identified, for example. One or more informational or explanatory data sets that can be displayed as visual representations 190 may be transmitted to a presentation device, together with the directives or instructions indicating how the visual representations are to be laid out. In some embodiments, at least some of the informational data may be provided in non-visual formats. In response to further exploration requests received via the programmatic interfaces 177, additional data sets may be prepared and transmitted to the presentation devices, e.g., indicating specific features in examples of the training data set used for the model (or in the input records whose results are being explored) that were influential in the results generated by the trained models.

In at least some embodiments, the informational data presented by the MLS may be used to detect problems in the training process (e.g., in cases where the training data is not truly representative of the post-training input) and the programmatic interfaces 177 may be used to request retraining of the model. In various embodiments, the MLS may generate at least some sets of informational data for presentation to clients without receiving corresponding queries 170. For example, the MLS may detect that a particular result from a trained model 126, or some set of results from the trained model, are anomalous with respect to a baseline or typical set of results. If such an outlier result is detected, in one embodiment a visual representation of how anomalous the result is, and one or more factors which may have contributed to its being anomalous, may be provided using informational data sets produced by the MLS.

Example Model Types

Figure 2:
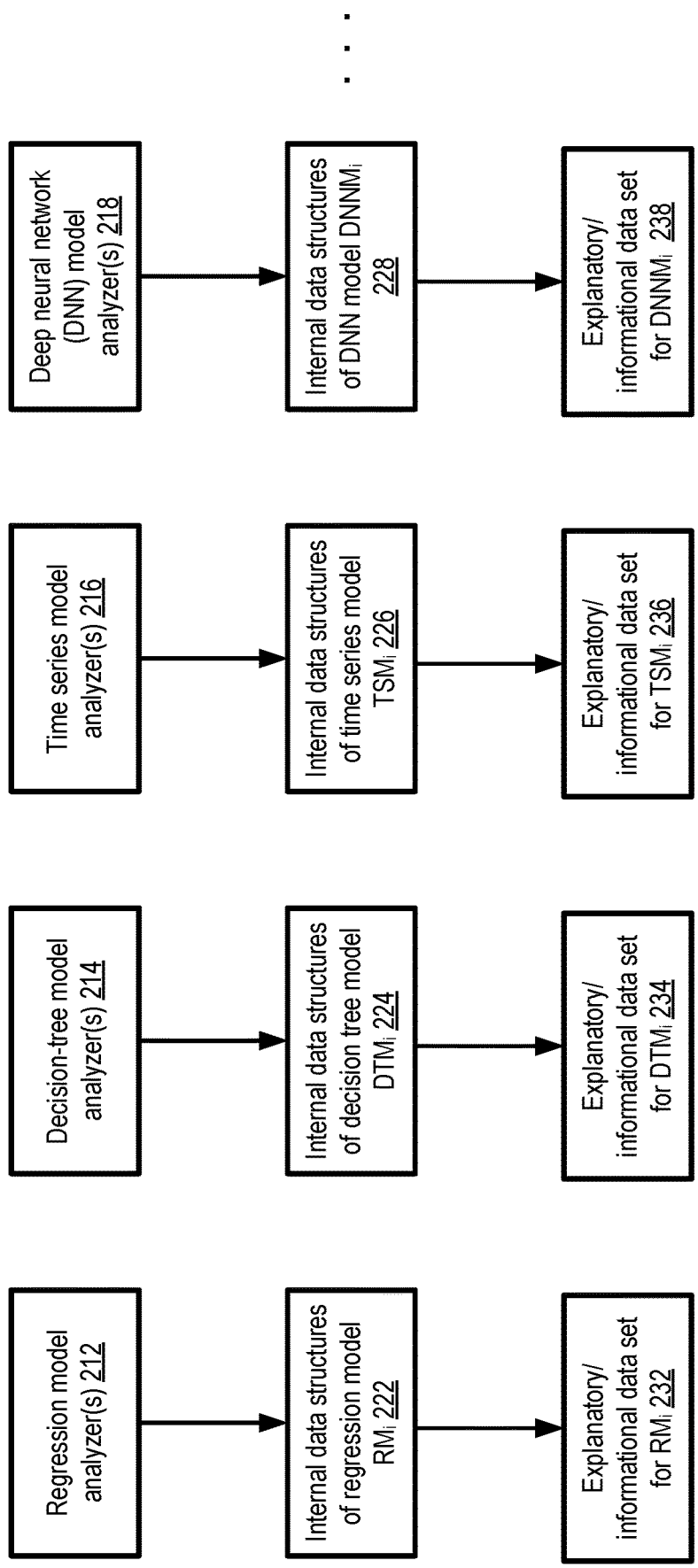
FIG. 2 illustrates examples of model type-specific analyzers which may be used at a machine learning service, according to at least some embodiments.

FIG. 2 illustrates examples of model type-specific analyzers which may be used at a machine learning service, according to at least some embodiments. In the depicted embodiment, informational or explanatory data sets regarding at least four categories of machine learning models may be generated at the service.

As shown, exploration of regression models, decision-tree models, time series models, and deep neural network models may be supported in the depicted embodiment, using analyzers specifically configured for the respective types of models. In response to a client's query directed at a particular trained regression model $RM_j$, internal data structures 222 of $RM_i$ may be examined by a regression model analyzer 212 to produce explanatory/informational data sets 232 of which visual representations may be provided to a client. Similarly, internal data structures 224 of a decision tree model $DTM_i$ may be analyzed by a decision-tree model analyzer 214 to generate explanatory/informational data set 234, internal data structures 226 of a time series model $TSM_i$ may be analyzed by a time series model analyzer 216 to generate explanatory/informational data set 236, and internal data structures 228 of a deep neural network model $DNNM_i$ may be analyzed by a deep neural network model analyzer 218 to generate explanatory/informational data set 238 in the depicted embodiment. The types of internal data structures (generated during the model training phases) examined by the analyzers 212, 214, 216 and 228 may differ, and may for example include vectors, matrices, maps, hash tables, dictionaries, linked lists and the like in different embodiments. In at least some embodiments, the analyzers 212, 214, 216 or 228 may themselves comprise machine learning models, which may for example learn how to respond more effectively to different types of client queries over time.

Classification Score Display Example

Figure 3:
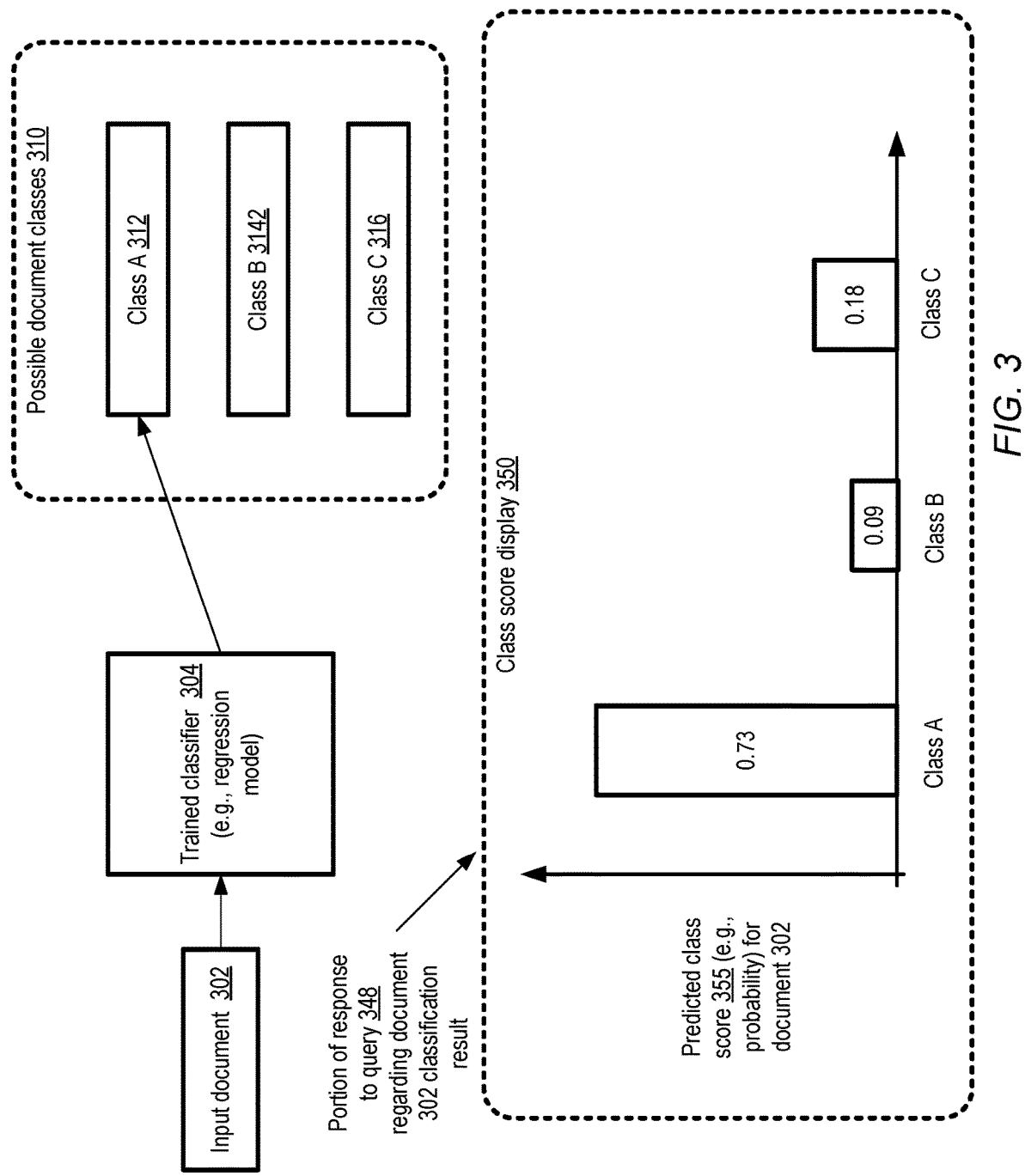
FIG. 3 illustrates an example set of classification scores which may be displayed with respect to a particular input data record during interactive exploration of a machine learning model, according to at least some embodiments.

FIG. 3 illustrates an example set of classification scores which may be displayed with respect to a particular input data record during interactive exploration of a machine learning model, according to at least some embodiments. In the depicted embodiment, a trained classifier 304 may determine a particular class of a set of possible document classes (class A 312, class B 314 and class C 316) to which a particular input document 302 belongs.

In response to a query received from a client of the machine learning service, indicating that further details or clarifications regarding the result generated by classifier 304 with respect to an input document 302 is to be provided, the machine learning service may generate one or more informational data sets, including one data set which can be represented by a class score display graph 350. Within the class score display 350, the respective scores 355 generated by the classifier 304 for the input document 302 and for each of the three possible classes may be shown in the depicted embodiment. For example, a score of 0.73 (which may be interpretable as a probability of 73%) may have been assigned to class A, a score of 0.09 or 9% may have been assigned to class B, and a score of 0.18 or 18% may have been assigned to class C as shown in the depicted embodiment. In some embodiments, the class score display may be sorted in descending (or ascending) order—e.g., the score for class B may be displayed between the scores for classes A and C. In various embodiments in which a classification model is being explored, such a per-class score graph may represent the first set of information that is provided to a client, as it is fairly easy to interpret and provides an indication of how close the alternative classification results were relative to one another. In some embodiments in which the number of possible classes is large, the displayed scores may correspond to a subset of the possible classes (e.g., out of 100 possible classes, only the scores for the top ten classes may be displayed).

Feature Exploration Examples

Figure 4:
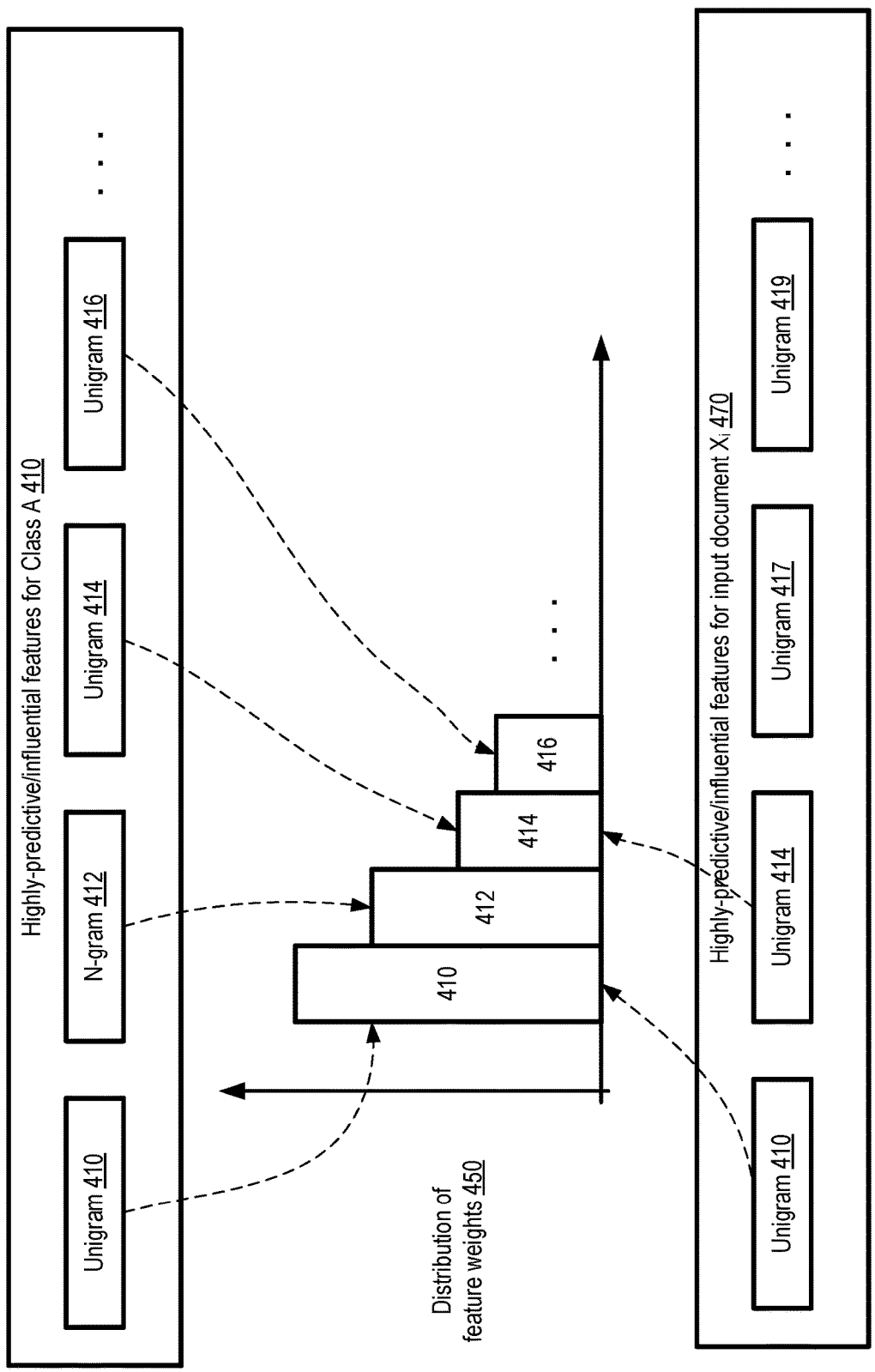
FIG. 4 illustrates examples of information pertaining to influential features which may be displayed during interactive exploration of a machine learning model, according to at least some embodiments.

FIG. 4 illustrates examples of information pertaining to influential features which may be displayed during interactive exploration of a machine learning model, according to at least some embodiments. In the depicted embodiment, the input records for a classification model may comprise collections of text tokens, from which input features for the model may be derived. For example, depending on the model, the count of individual unigrams or N-grams (sequences of N consecutive text words, phonemes or syllables) may be used as input features for which respective weights may be learned during the training phase of the model. For each class to which input records may be mapped, some set of text features may be identified as the most predictive or influential in the depicted embodiment with respect to the classification score in various embodiments. A particular feature F1 may be considered more influential with respect to classifying input records as members of a given class A in one embodiment than another feature F2 if, for example, the presence of F1 alone in an input record has a higher correlation with the record being classified as a member of class A than the presence of F2 alone. Respective numeric weights may be attached to each of the features during training in various embodiments, indicating the extent of the influence of the feature for each class.

In some embodiments, in response to an exploration request or query directed to the classification of a particular input record as an example of a given class such as class A, a machine learning service may provide several types of information indicating multiple relevant features. For example, a set or an ordered list of features 410 which meet an influence criterion or threshold with respect to classification of the input records as members of class A may be indicated via a programmatic interface in the depicted embodiment. As shown, unigram 410, N-gram 412, unigram 414 and unigram 416 may have been identified as the most influential features with respect to class A. In addition to a list of the influential features, the distribution 450 of the corresponding feature weights (indicating how influential the features are relative to one another) may be displayed in some embodiments.

In addition to the distribution of the weights of the features which meet the threshold criterion for a given class in general, in at least some embodiments an indication of the most influential features within the particular input record whose results are being explored may be provided to the MLS client in response to an exploration request. For example, as shown, a list of the highly predictive or influential features 470 for a given input document Xi may be displayed, ranked in the depicted example in descending order by weight. Within the text of Xi, unigrams 410, 414, 417 and 419 may have been identified as the most influential features, and based at least in part on the presence of those features (which overlap as shown with the most important features associated with class A in general), Xi may have been classified as a member of class A. The details of the influence criteria that are used to decide which features to display, for a given input document and/or for a given class with respect to the entire training data set, may vary from one implementation to another. For example, in some implementations, the top K features in descending order of weights may be selected, while in other implementations, features whose weights exceed a minimum threshold may be selected for display. In at least one embodiment, clients may be permitted to specify the influence criteria (as well as other desired properties of the displayed information) programmatically, e.g., via control elements of a web-based interface or a graphical user interface.

Figure 5:
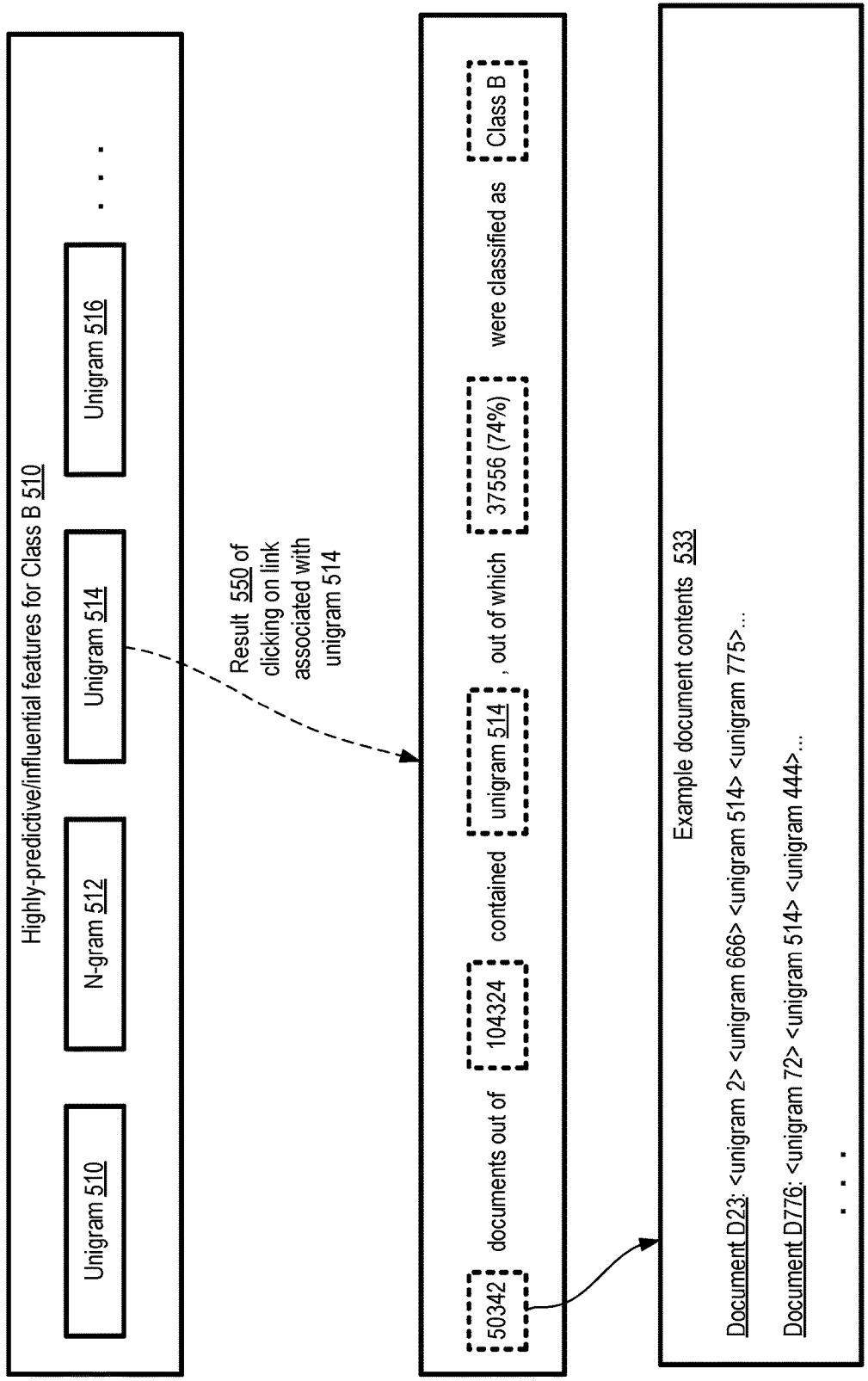
FIG. 5 illustrates aspects of results which may be displayed in response to a request for details regarding a particular feature, according to at least some embodiments.

Other types of information pertaining to features, including for example statistics regarding the occurrences of the features within training data and/or post-training input records may be provided by the MLS in some embodiments. FIG. 5 illustrates aspects of results which may be displayed in response to a request for details regarding a particular feature, according to at least some embodiments. In the depicted embodiment, a list 510 of influential features for a particular class B may be displayed, with interactive interface elements such as clickable web links being provided with each of the listed features 510, 512, 514 and 516. If a client of the MLS, when presented with a list similar to 510, clicks on one of the interactive elements, statistics associated with the corresponding feature may be displayed in some embodiments.

The result 550 of clicking on a link associated with one of the influential features (unigram 514) may comprise the following information in the depicted example scenario. Out of a total of 104324 documents examined (e.g., as part of the training data set for the model being explored), 50342 documents contained unigram 514. Among those 50342, 37556 or approximately 74 percent of the documents were classified as members of class B. In addition, in at least some embodiments, contents 533 (e.g., a subset of the text of the documents which show the words/unigrams in the vicinity of the feature) of the documents which contain the feature may be shown. For example, from among the 50342 documents which contained occurrences of the unigram 514, contents of documents D23 and D776 are shown in FIG. 5. It is noted that the arrangement of the displayed information may differ in various embodiments from that shown in FIG. 3, FIG. 4 and FIG. 5; these figures are intended to show examples of the kinds of information that may be conveyed regarding classification models, associated results and input features, and are not intended to be restrictive or limiting.

Decision Tree Traversal Example

Figure 6:
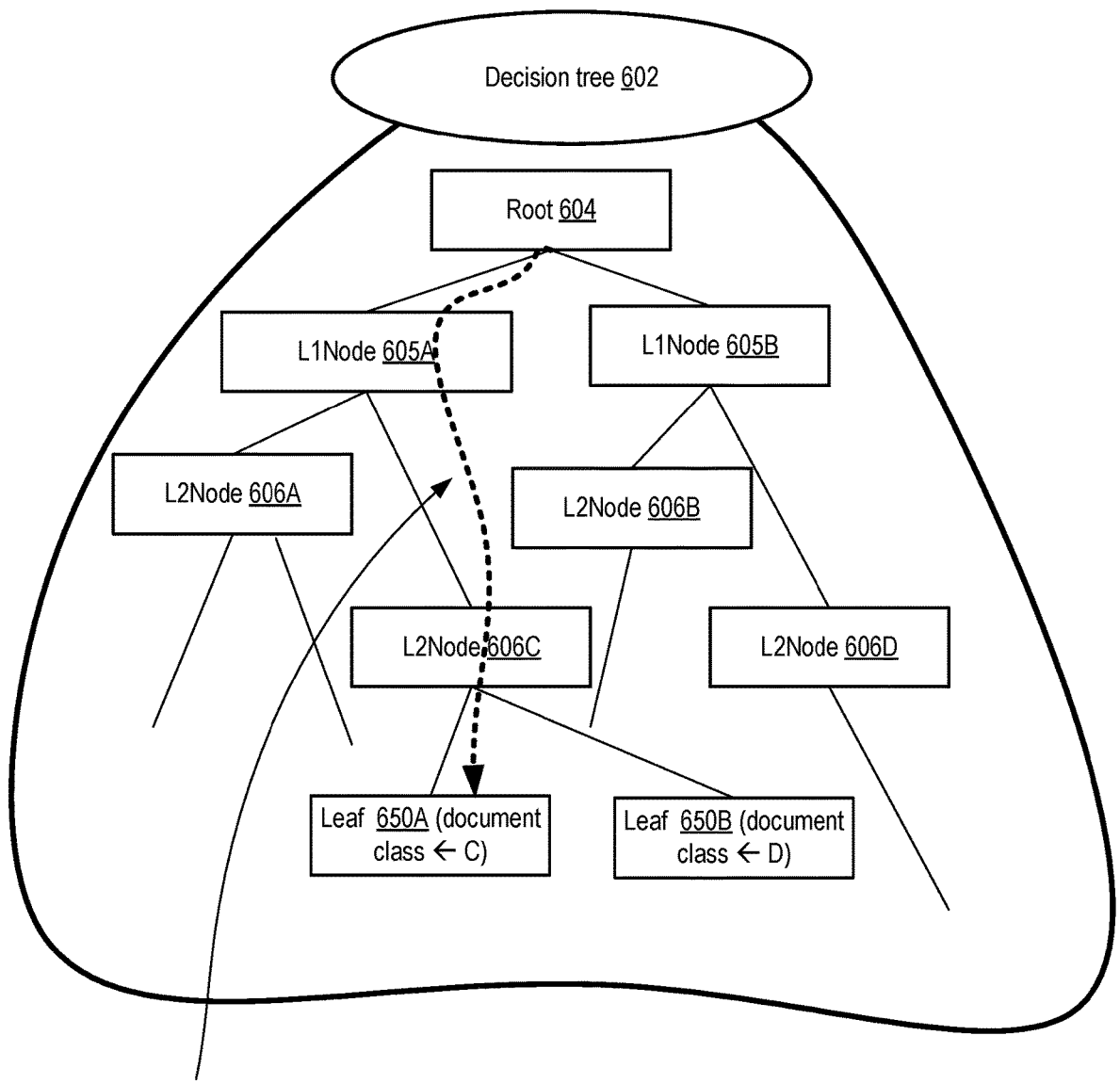
FIG. 6 illustrates example information which may be displayed with respect to a decision-tree based machine learning model, according to at least some embodiments.

FIG. 6 illustrates example information which may be displayed with respect to a decision-tree based machine learning model, according to at least some embodiments. In a decision-tree based model, one or more trees whose non-leaf and non-root nodes represent input feature condition checks may be constructed. For example, at a given node with two leaf-ward edges leading out of it, the particular next edge to be traversed on a path towards a leaf node may be determined by the result of one or more comparisons of the form "is feature A>value V?", with one edge being selected based on the result for a given input record. Thus, for a given input record, a path from the root node to a leaf node may be traversed in accordance with the feature values of the input record, with a prediction result being identified at a leaf node.

In the example scenario shown in FIG. 6, a decision tree 602 comprises a root node 604, two level 1 nodes 605A and 605B, four level 2 nodes 606A-606D and at least two leaf nodes 650A and 650B. At each of the L1 and L2 nodes, a condition pertaining to some combination of one or more input record features may be checked. As shown, as a result of traversing path 650 from the root to leaf node 650A, the class of a particular input document may have been identified as class C. In at least some embodiments, in response to a query pertaining the classification of the input record, the path 650 (as well as at least some other nodes and edges of the tree) may be displayed for a client of a machine learning service, e.g., based at least in part on an examination of the data structures used to store the decision tree. In some embodiments, additional types of information pertaining to decision trees, such as the set of training records or features used to generate a given tree or a given node, may also or instead be indicated in response to model queries. It is noted that information pertaining to various aspects of other types of supported models, such as neural network models (for which, for example, the activation strengths of various nodes at different layers for a given input record may be shown), time series models (for which the values of different Gaussian parameters may be shown) and the like, may be provided by the machine learning service in different embodiments.

Model Pipeline Exploration Example

Figure 7:
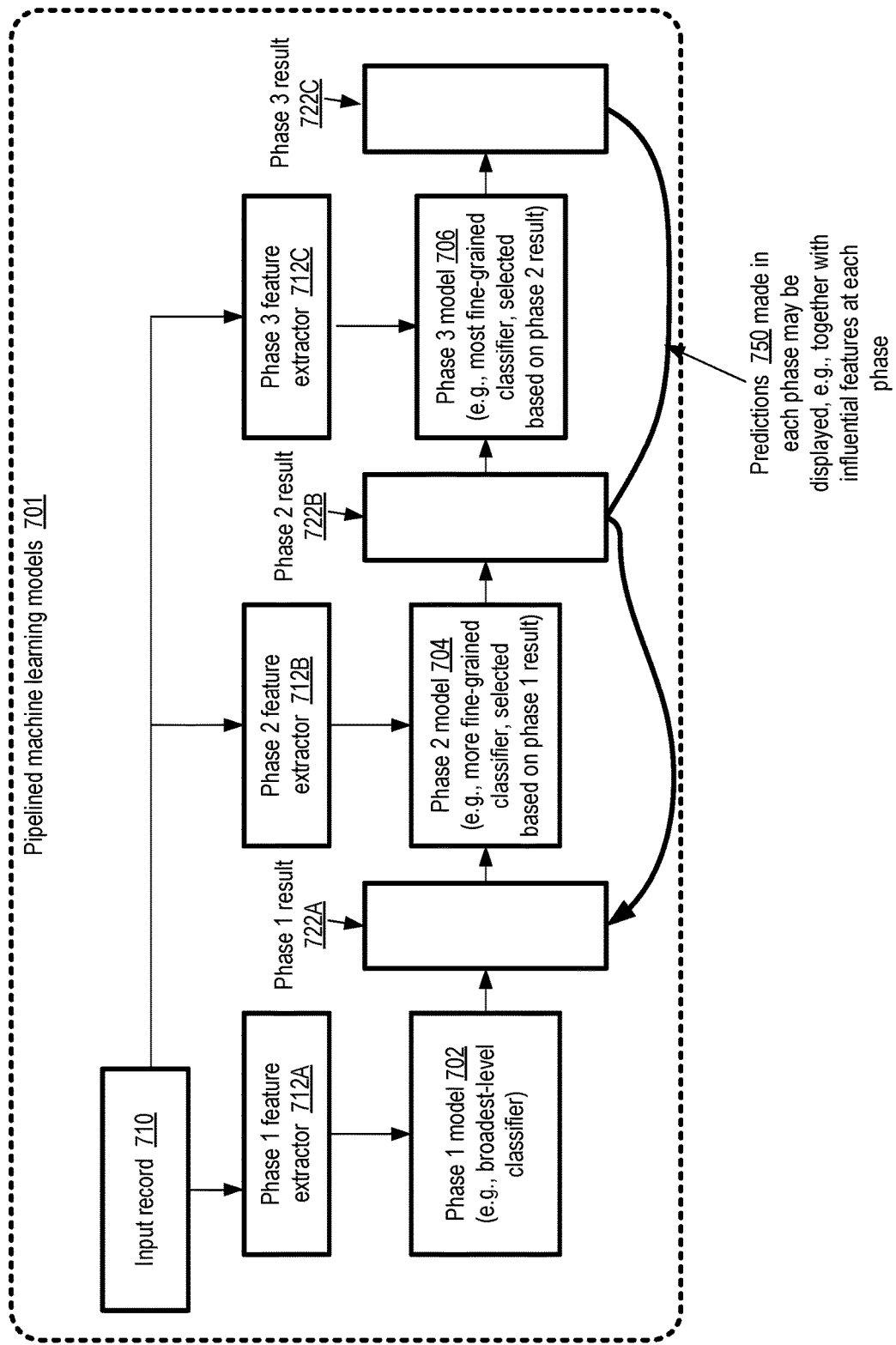
FIG. 7 illustrates example information which may be displayed with respect to a multi-phase machine learning model pipeline, according to at least some embodiments.

In some embodiments, a given machine learning problem may be solved using a collection of models rather than a single model, e.g., arranged in a pipeline or sequence in which successor models are used for finer-grained predictions or classifications than predecessor models. Such pipelines may present additional opportunities for interactive exploration and analysis, as the decisions made at some pipeline stages may be dependent on earlier decisions which may not necessarily be exposed by default to the users of the pipelines. FIG. 7 illustrates example information which may be displayed with respect to a multi-phase machine learning model pipeline, according to at least some embodiments. In the depicted embodiment, a set of pipelined machine learning models 701 may comprise a phase 1 model 702, a phase 2 model 704, and a phase 3 model 706.

In an embodiment in which the three models are used to perform successively higher granularities of classification, phase 1 model 702A may, for example, comprise a broadest-level classifier. The phase 2 model 704 may perform more fine-grained classification than the phase 1 model 702, and the particular classifier 704 to be used may in some implementations be selected based at least in part on the phase 1 classification result 722A. Similarly, the phase 3 model 706 may be used for classification at an even higher granularity than the phase 2 model 704 in at least some embodiments, based at least in part on the phase 2 result 722B, eventually providing the phase 3 result 722C. Consider a scenario in which an input record may be classified at several levels of granularity: at the broadest level, into classes A, B, C or D. Then, at the second level, if the broadest class is A, the record may be classified (using a second level classifier 704) further into one of four second-level classes AA, AB, AC and AD. Similarly, if the broadest class was B, a second-level classifier specifically for instances of B may be used to classify the record into one of four other second-level classes BA, BB, BC or BD, and so on.

In some embodiments, respective sets of features may be extracted for each phase of the analysis. For example, as shown, from an input record 710, a set of phase 1 features may be obtained via extractor 712A, a set of phase 2 features may be extracted via extractor 712B, and a set of phase 3 features may be extracted by a third extractor 712C. In some embodiments, separate feature extractors may not be used. In various embodiments, the predictions/classifications 750 made at each phase may be displayed or presented via programmatic interfaces using the model type-specific methodology discussed above, e.g., together with information about influential features at each stage. Clients may be able to, for example, navigate programmatically backwards or forwards through the various phases of the analysis, examining the intermediate results and features used at the different phases using visualizations at varying levels of detail as desired. In at least one embodiment, different types of models may be used at respective stages of the analysis—e.g., a logistic regression model may be used in one phase, while a neural network model may be used in another. The tools provided for exploration of the pipeline may utilize model type-specific modules or subcomponents to provide explanations for each stage, and to enable phase-to-phase explorations in a seamless manner in various embodiments.

Example Programmatic Interactions

Figure 8:
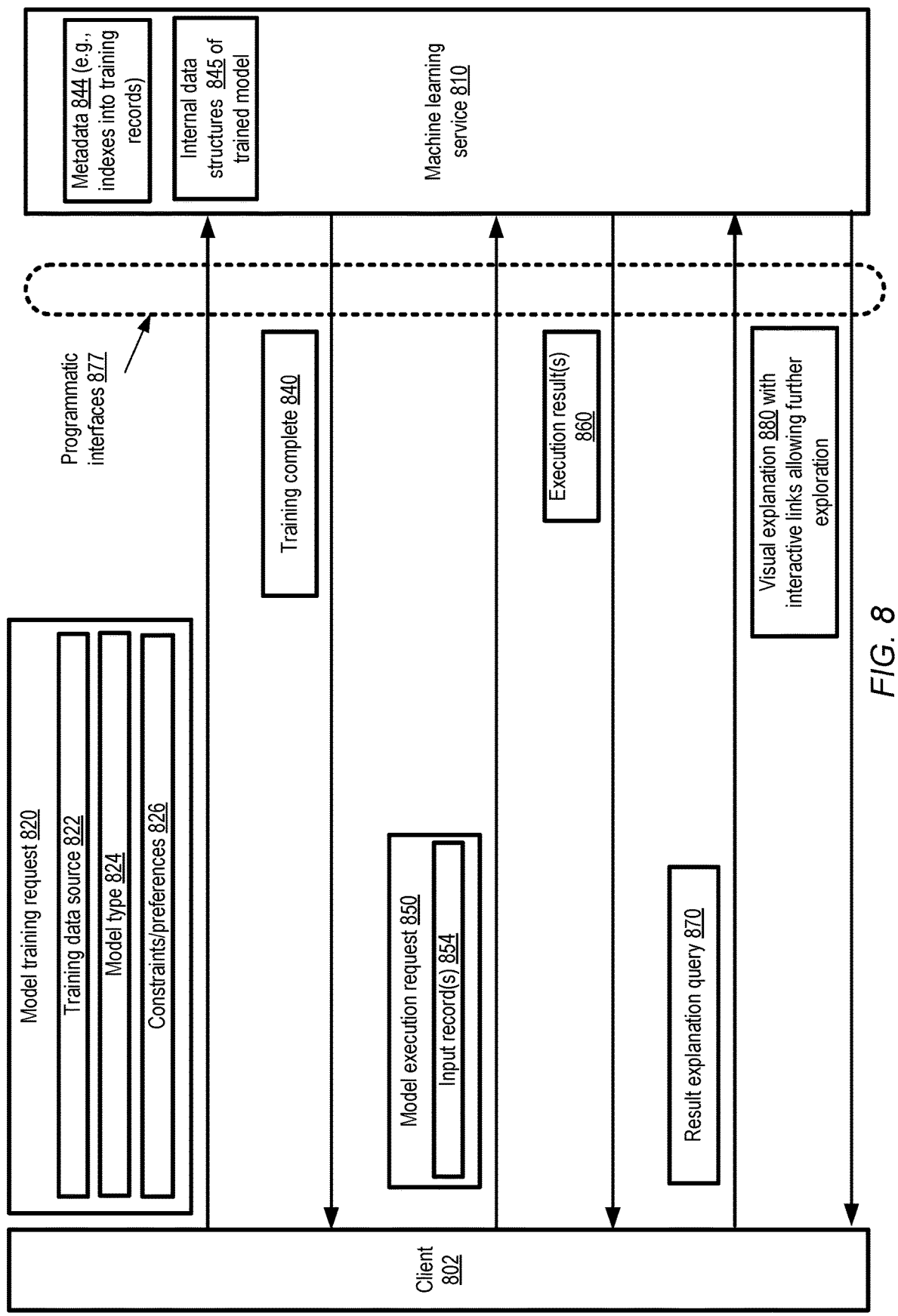
FIG. 8 illustrates aspects of a first set of programmatic interactions between a client and a machine learning service, according to at least some embodiments.

FIG. 8 illustrates aspects of a first set of programmatic interactions between a client and a machine learning service, according to at least some embodiments. In the depicted embodiment, a machine learning service 810 may implement one or more programmatic interfaces 877 for client requests and responses. The programmatic interfaces may, for example, include web-based consoles, graphical user interfaces, application programming interfaces (APIs), command line tools and the like. A client 802 may submit a model training request 820 to the machine learning service 810 via the programmatic interfaces 877 in the depicted embodiment. A training request 810 may, for example, indicate a training data source 822 from which labeled data may be obtained, the model type 824, and/or a set of constraints or preferences 826 in some embodiments. The constraints or preferences may indicate, for example, a computing budget limit, a storage/memory budget limit, a target time by which the training is to be completed, and so on.

In response to such a training request 820, a model may be trained at the service 810, and a message 840 indicating that the training phase is complete may be transmitted back to the client 802 in the depicted embodiment. Internal data structures 845 (such as various matrices, vectors, and the like indicating learned weights of various features) of the trained model may be stored by the service 810, e.g., together with metadata 844 such as indexes into the specific training data records within which various features occurred in some embodiments. The metadata 844 and/or the internal data structures 845 may be examined to provide explanations for model results and to support exploration of the trained model in at least some embodiments.

At some point after the model has been trained, the client 802 may submit an execution request 850, indicating that prediction results are to be obtained for some set of input record(s) 854. In response, the model may be executed at the service 810, and a set of execution results 860 corresponding to the input record(s) may be provide programmatically to the client 802.

If the client wishes to obtain an explanation of a result, a query 870 may be submitted in the depicted embodiment via programmatic interfaces 877. In response to the query, the internal data structures 845 and/or the feature metadata 844 may be examined at the service 810 to provide one or more visual explanations 880 in the depicted embodiment. The visual explanation may be presented via an interface with interactive controls such as web links which can be used by the client to explore the model further as desired in the depicted embodiment.

Figure 9:
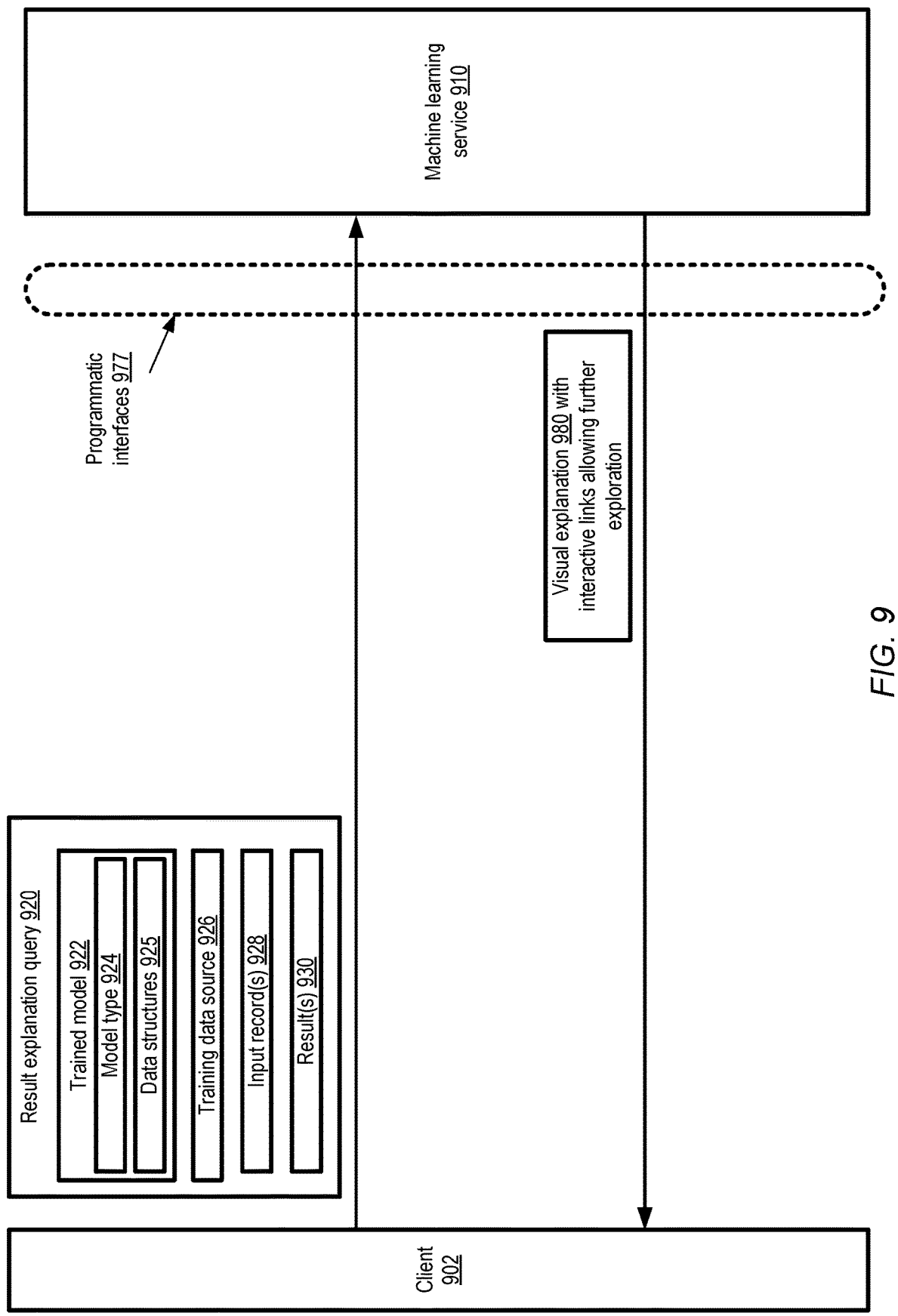
FIG. 9 illustrates aspects of a second set of programmatic interactions between a client and a machine learning service, according to at least some embodiments.

In the scenario depicted in FIG. 8, a model was trained at the machine learning service at the client's request. In some embodiments, instead of using the service to train the model, a client may provide a previously-trained model to the service and then use the service's tools to explore the results and internal aspects of the trained model. FIG. 9 illustrates aspects of a second set of programmatic interactions between a client and a machine learning service, according to at least some embodiments. As shown, a result explanation query 920 may be submitted to machine learning service 910 via programmatic interfaces 977 in the depicted embodiment.

The result explanation query 920 may include a representation of a trained model 922 (e.g., a model that was trained using resources external to the machine learning service) in the depicted embodiment. The trained model 922 may, for example, comprise a set of one or more files formatted in a particular format which is among the supported formats of the service 910. Such files may, for example, indicate the model type 924 and include persistent/serialized versions of the internal data structures 925 generated during training of the model in various embodiments. In addition, in at least some embodiments, the query 920 may include an indication of the training data source 926 used for the model, the input record(s) 928 and the result(s) 930 (corresponding to input record(s) 928) for which an explanation is desired.

In response to receiving the query 920, a model type-specific analyzer (similar to the analyzers depicted in FIG. 2) may be invoked at the service 910 in the depicted embodiment. The analyzer may examine the internal data structures 925 of the trained model 922, as well as the training data and the input records whose results are to be explored. Based on its examinations of the model and the data, a visual explanation 980 may be provided to the client 902, e.g., within which a set of interactive controls such as links may be incorporated to allow the client to explore various aspects of the model.

Provider Network Environment

Figure 10:
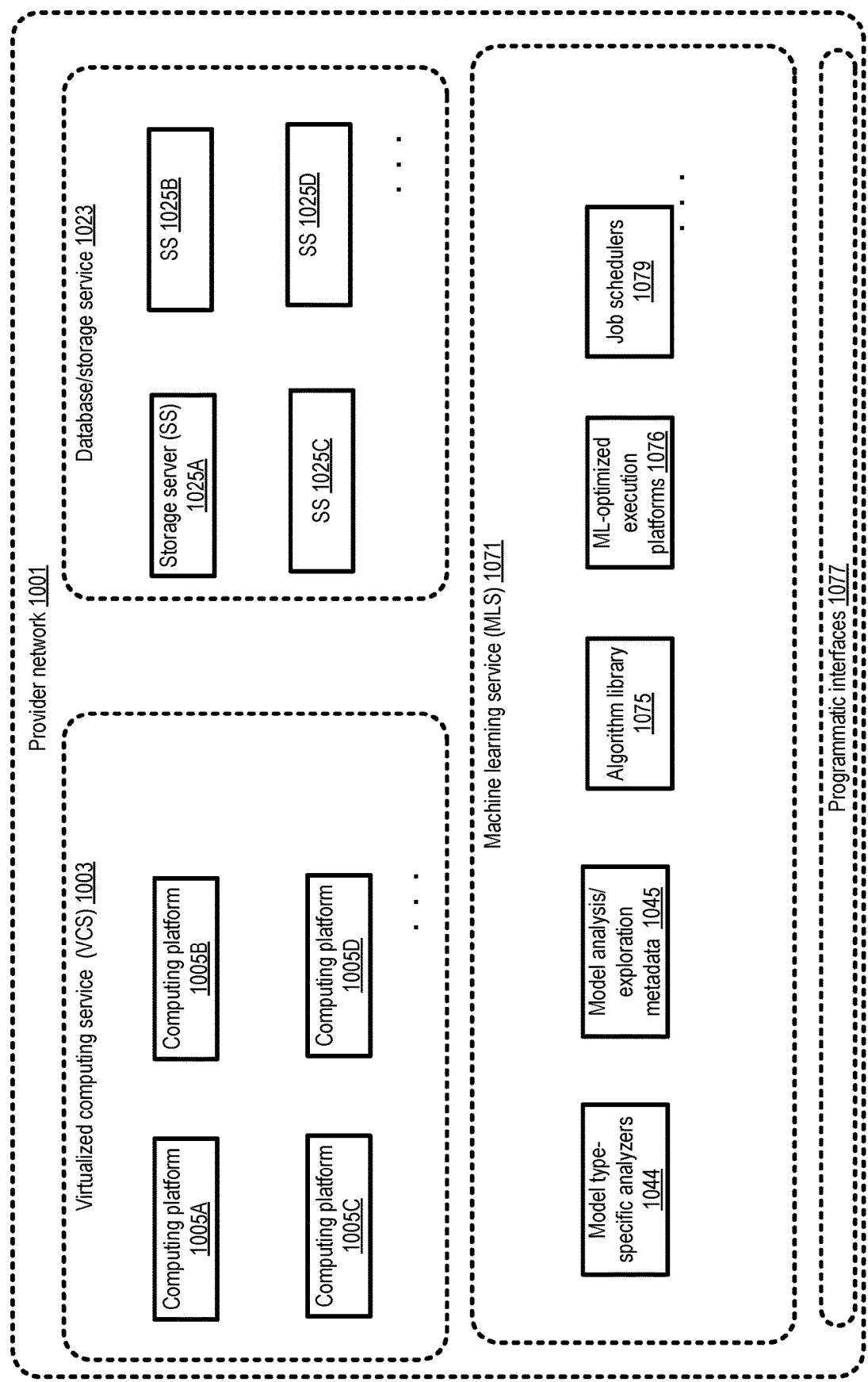
FIG. 10 illustrates a provider network environment at which a machine learning service may be implemented, according to at least some embodiments.

In some embodiments, the techniques discussed above for providing explanations and interactive exploration of machine learning models may be implemented at a provider network. FIG. 10 illustrates a provider network environment at which a machine learning service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1001 may comprise resources used to implement a plurality of services, including for example a virtual computing service (VCS) 1003, a database or storage service 1023, and a machine learning service (MLS) 1071. Components of a given service may utilize components of other services in the depicted embodiment—e.g., for some machine learning tasks, a component of the machine learning service 1071 may utilize virtual machines implemented at computing platforms such as 1005A-1005D of the virtualized computing service. Input data, intermediate results, final results and/or other artifacts of various machine learning algorithms or models, may be stored at storage servers 1025 (e.g., 1025A-1025D) of the database or storage service 1023 in some embodiments. Individual ones of the services shown in FIG. 10 may implement a respective set of programmatic interfaces 1077 which can be used by external and/or internal clients (where the internal clients may comprise components of other services) in the depicted embodiment.

As shown, the MLS 1071 may comprise, among other components, one or more model type-specific analyzers 1044 and model analysis/exploration metadata 1045 in the depicted embodiment. A number of different types of machine learning algorithms may be included within the algorithm library 1075 in the depicted embodiment, for at least some of which respective model type-specific analyzers may be implemented. In some embodiments, requests to train some types of machine learning models (such as some regression or deep neural network models) may be handled as batch jobs at the machine learning service, and a batch job scheduler 1079 may orchestrate the allocation of resources for the jobs as well as dependencies among jobs. In at least one embodiment, a machine learning service 1071 may have access to or include a set of execution platforms 1076 that are optimized for machine learning tasks (e.g., platforms that have customized hardware such as GPU arrays and/or customized software stacks). Depending on the suitability of such platforms for model analysis and exploration tasks, one or more execution platforms 1076 may be employed in response to queries requesting results explanations and/or model exploration in the depicted embodiment.

In at least some embodiments, the operations described earlier for explaining and exploring machine learning models may be accomplished using non-specialized computing platforms of the virtualized computing service 1003. In various embodiments, at least some of the models and/or metadata used for generating explanations/explorations may be stored at a database/storage service 1023. The techniques for analyzing and exploring models described above may be implemented without acquiring resources of network-accessible services such as those shown in FIG. 10 in at least some embodiments. For example, a standalone tool implemented at one or more computing devices which are not part of a network-accessible service may be used in some embodiments.

Methods for Enabling Model Exploration

Figure 11:
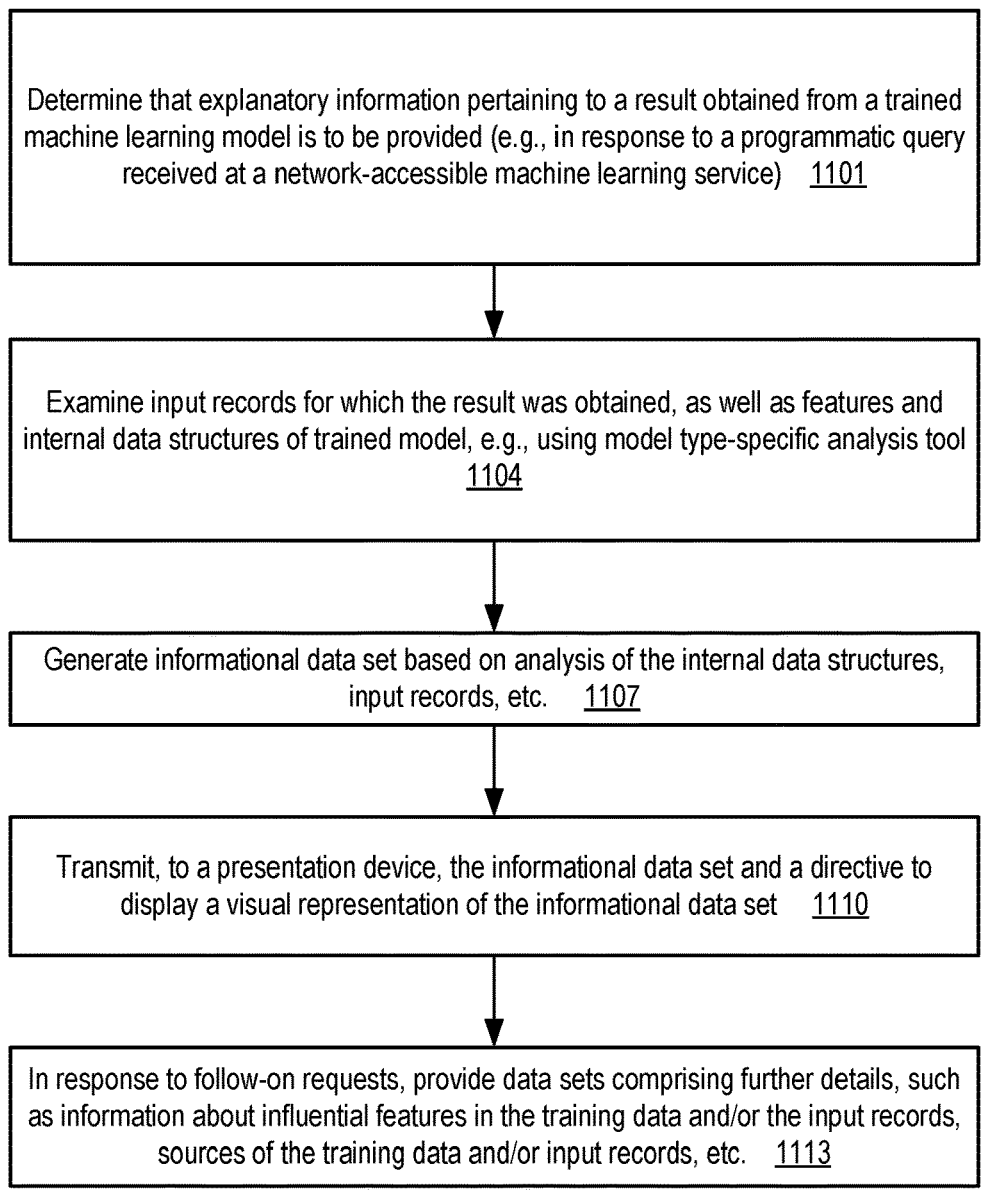
FIG. 11 is a flow diagram illustrating aspects of operations that may be performed to enable visual exploration of machine learning models and results at a network-accessible service, according to at least some embodiments.

FIG. 11 is a flow diagram illustrating aspects of operations that may be performed to enable visual exploration of machine learning models and results at a network-accessible service, according to at least some embodiments. As shown in element 1101, a determination may be made that explanatory information pertaining to one or more results obtained from a trained machine learning model is to be provided (e.g., in response to a programmatic query received at the network-accessible service). In some cases, the model may have been trained at the service, while in other cases explanation/exploration may be desired for a model which has already been trained.

The input records for which the result was obtained, as well as internal data structures and features of the trained model may be examined, e.g., using model type-specific analysis tools in at least some embodiments (element 1104). An informational data set based at least in part on the examination of the internal data structures (at least some of which may have been generated during the model's training phase) and input records may be generated (element 1107).

The informational data set may be transmitted to a presentation device (element 1110), e.g., with a directive to display a visual representation of the data. The interface used for the display may comprise a number of interactive controls, such as clickable links and the like, which may be used by viewers to submit follow-on requests for additional details. In response to such follow-on requests, additional data sets may be prepared and provided (element 1113), containing information about influential features in the input records and/or in the training data used for the model in various embodiments. In some embodiments, as mentioned earlier, information about the sources from which various records of the training data were obtained may be included in the data sets transmitted to the presentation devices. Different data sources may potentially differ in the quality, trustworthiness or statistical distributions of the data they provide; consequently, information about data provenance or origins may be helpful in some cases in debugging models, or more generally in understanding the results generated by the models. In at least some embodiments, interactive controls may be used by viewers to modify or adjust various aspects of the displayed information during various stages of the analysis, e.g., by zooming in to obtain more detailed information, changing thresholds for selecting feature information to be displayed, and so on.

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of providing insights into the results produced by various types of machine learning models based on the analysis of model type-specific data structures, as well as providing details about important features of the input data, may be useful in a variety of scenarios. More and more applications rely on outputs generated by machine learning models, and it may often be the case that while the models generate fairly accurate results, the underlying logic used to generate the results may not be straightforward for many of the individuals utilizing the results or affected by the results to understand. By providing easy to use interactive visualizations of the probabilities associated with various alternative results, and details regarding which specific features of the input data were most influential, the confidence levels of the users in the results may be enhanced. Furthermore, in some cases, exposing such details may enable models to be debugged, and unanticipated statistical characteristics in the training data to be identified, leading to higher-quality predictions overall.

Illustrative Computer System

Figure 12:
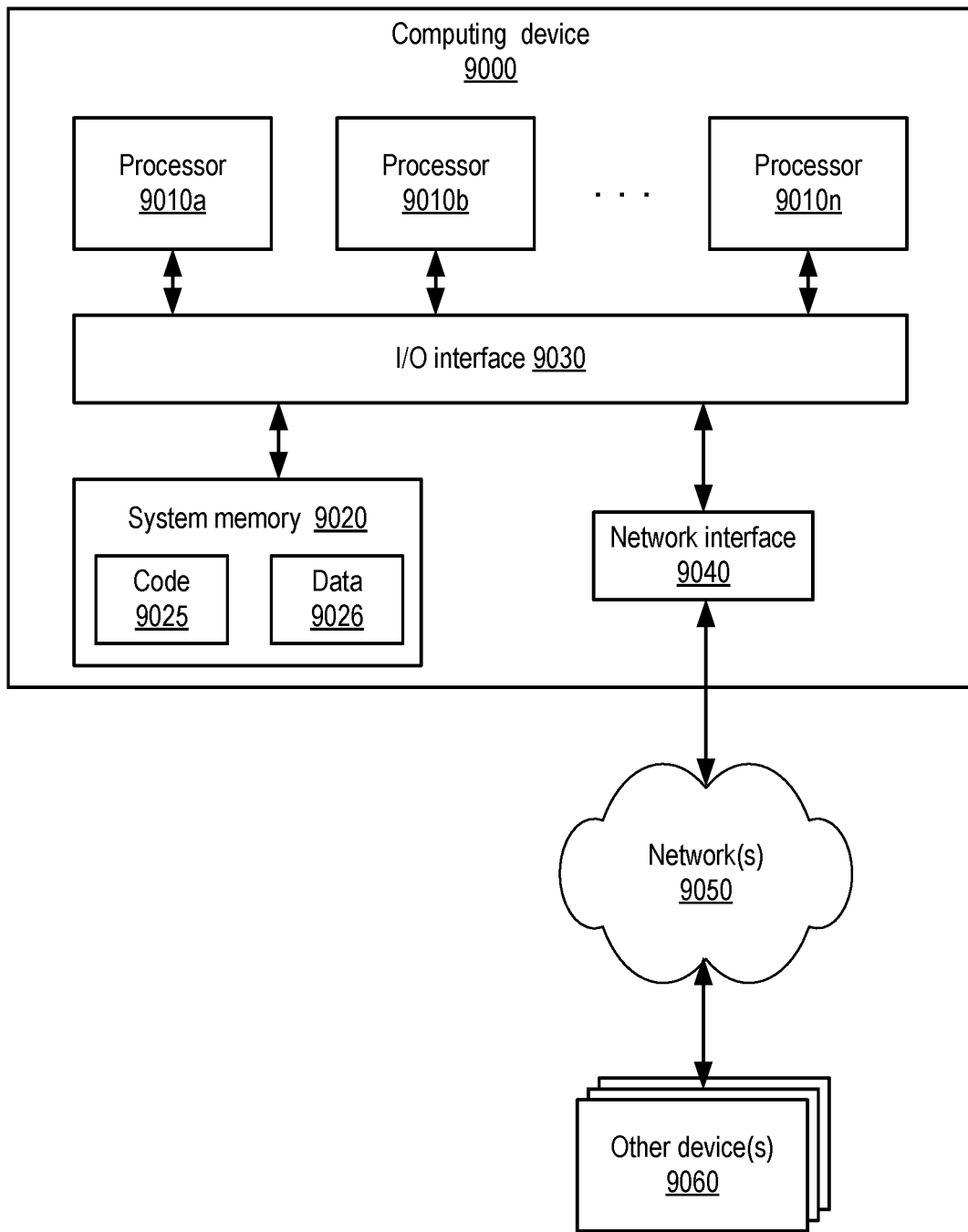
FIG. 12 is a block diagram illustrating an example computing device that may be used in at least some embodiments.

In at least some embodiments, a server that implements a portion or all of one or more of the technologies described herein, including the training and analysis of machine learning models, the generation of informational data sets regarding various results produced by the models, and the identification of influential features, may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a machine learning service of a provider network;
wherein the one or more computing devices are configured to:
determine that a query indicating one or more results generated by a trained version of a machine learning model and requiring an analysis of the one or more indicated results has been received via a programmatic interface of the machine learning service of the provider network;
examine (a) one or more data structures generated during a training phase of the machine learning model and (b) respective input records for which the one or more results that are indicated in the query received via the programmatic interface of the machine learning service of the provider network are generated;
generate, based at least in part on the one or more data structures and the respective input records associated with the one or more results indicated in the received query, a first informational data set pertaining to the one or more results, wherein the first informational data set indicates a probability associated with at least one result generated for at least one of the input records, which is alternative to at least one of the one or more indicated results corresponding to the at least one input record;
transmit, to a presentation device, the first informational data set pertaining to the one or more results indicated in the received query and a directive to display a visual representation of the first informational data set via a first interactive interface; and
in response to an indication that an exploration request pertaining to the first informational data set displayed in the visual representation has been received, transmit, to the presentation device, a second informational data set comprising an indication of one or more observations of a training data set used during the training phase, wherein the one or more observations meet an influence criterion associated with the one or more results.

2. The system as recited in claim 1, wherein the machine learning model comprises one or more of: (a) a regression model, (b) a decision-tree based model, (c) a neural network-based model, or (d) a time series model.

3. The system as recited in claim 1, wherein the one or more computing devices are configured to:
determine that a representation of the trained version of the machine learning model has been received via a programmatic interface, wherein the one or more data structures are indicated in the representation.

4. The system as recited in claim 1, wherein the one or more computing devices are configured to:
determine that an indication of the training data set has been received via a programmatic interface.

5. The system as recited in claim 1, wherein the machine learning model comprises a classification model, wherein the directive indicates that the visual representation is to include a display of a set of classification scores for a plurality of classes associated with a particular input data record.

6. A method, comprising:
performing, by one or more computing devices of a network-accessible service:
examining (a) one or more data structures generated during a training phase of a machine learning model and (b) respective input records for which one or more results are generated by the machine learning model, wherein the results are indicated in a query received by the network-accessible service;
generating, based at least in part on the one or more data structures and the respective input records associated with the one or more results indicated in the received query, a first informational data set pertaining to the one or more results, wherein the first informational data set indicates a probability associated with at least one result generated for at least one of the input records, alternative to at least one of the one or more results corresponding to the at least one input record;
transmitting, to a presentation device, the first informational data set pertaining to the one or more results indicated in the received query and a directive to display a visual representation of the first informational data set via a first interactive interface; and
in response to an indication that an exploration request pertaining to the first informational data set displayed in the visual representation has been received, transmitting, to the presentation device, a second informational data set comprising an indication of one or more observations of a training data set used during the training phase.

7. The method as recited in claim 6, wherein the machine learning model comprises one or more of: (a) a regression model, (b) a decision-tree based model, (c) a neural network-based model, or (d) a time series model.

8. The method as recited in claim 6, further comprising performing, by the one or more computing devices:
determining that a representation of the trained version of the machine learning model has been received via a programmatic interface, wherein the one or more data structures are indicated in the representation.

9. The method as recited in claim 6, further comprising performing, by the one or more computing devices:
  determining that an indication of the training data set has been received via a programmatic interface.

10. The method as recited in claim 6, wherein the machine learning model comprises a classification model, and wherein the directive indicates that the visual representation is to include a display of a set of classification scores for a plurality of classes associated with a particular input data record.

11. The method as recited in claim 6, wherein the machine learning model comprises a classification model, and wherein the directive indicates that the visual representation is to include a display of a set of features and associated feature weights.

12. The method as recited in claim 11, wherein the set of features comprises one or more features which meet an influence criterion with respect to a particular class.

13. The method as recited in claim 11, wherein the set of features comprises one or more features which meet an influence criterion with respect to a result generated by the machine learning model for a particular input data record.

14. The method as recited in claim 6, wherein the directive indicates that the visual representation is to display a path taken through a decision tree with respect to a particular input record.

15. The method as recited in claim 6, further comprising the one or more computing devices are configured to:
  detect that a particular result generated by the machine learning model represents an anomaly with respect to another set of results generated by the machine learning model; and
  provide an indication via a programmatic interface that the particular result represents an anomaly.

16. A non-transitory computer-accessible storage medium storing program instructions that when executed on one or more processors cause the one or more processors to:
  analyze (a) one or more data structures generated during a training phase of a machine learning model and (b) respective input records for which one or more results are generated by the machine learning model, wherein the results are indicated in a query received via an interface;
  generate, based at least in part on the analysis of the one or more data structures and the input records associated with the one or more results indicated in the received query, a first informational data set pertaining to the one or more results, wherein the first informational data set indicates a probability associated with at least one result generated for at least one of the input records, alternative to at least one of the one or more results corresponding to the at least one input record;
  transmit, to a presentation device, the first informational data set pertaining to the one or more results indicated in the received query and a directive to display a visual representation of the first informational data set via a first interactive interface; and
  in response to an indication that an exploration request pertaining to the first informational data set displayed in the visual representation has been received, transmit, to the presentation device, a second informational data set comprising an indication of one or more observations of a training data set used during the training phase.

17. The non-transitory computer-accessible storage medium as recited in claim 16, wherein the instructions when executed on the one or more processors cause the one or more processors to:
  determine a representation of the trained version of the machine learning model has been received via a programmatic interface, wherein the one or more data structures are indicated in the representation.

18. The non-transitory computer-accessible storage medium as recited in claim 16, wherein the instructions when executed on the one or more processors cause the one or more processors to:
  determine that an indication of the training data set has been received via a programmatic interface.

19. The non-transitory computer-accessible storage medium as recited in claim 16, wherein the instructions when executed on the one or more processors cause the one or more processors to:
  generate a third informational data set indicating respective results of one or more stages of a pipeline comprising a plurality of machine learning models; and
  cause a visual representation of the third informational data set to be displayed at a presentation device.

20. The non-transitory computer-accessible storage medium as recited in claim 16, wherein the instructions when executed on the one or more processors cause the one or more processors to:
  in response to a training request received via a programmatic interface, train the machine learning model, wherein training of the model comprises generating one or more indices on the training data set, wherein at least one informational data set of the first or second informational data sets is based at least in part on an analysis of the one or more indices.

21. The non-transitory computer-accessible storage medium as recited in claim 16, wherein the instructions when executed on the one or more processors cause the one or more processors to:
  include, within at least one informational data set of the first or second informational data sets, an indication of a source of at least a portion of the training data set.

* * * * *